United States Patent
Zhang et al.

(10) Patent No.: US 12,199,680 B2
(45) Date of Patent: Jan. 14, 2025

(54) PHOTONIC INTEGRATED CHIP AND ULTRA WIDE BAND RADIO FREQUENCY PHOTONIC TRANSCEIVER

(71) Applicant: CHINA ELECTRONICS TECHNOLOGY GROUP CORPORATION NO 44 RESEARCH INSTITUTE, Chongqing (CN)

(72) Inventors: Yu Zhang, Chongqing (CN); Xu Liang, Chongqing (CN); Jing Xu, Chongqing (CN)

(73) Assignee: CHINA ELECTRONICS TECHNOLOGY GROUP CORPORATION NO 44 RESEARCH INSTITUTE, Chongqing (CN)

( * ) Notice: Subject to any disclaimer, the term of this patent is extended or adjusted under 35 U.S.C. 154(b) by 185 days.

(21) Appl. No.: 18/122,712

(22) Filed: Mar. 17, 2023

(65) Prior Publication Data

US 2024/0031030 A1    Jan. 25, 2024

(30) Foreign Application Priority Data

Jul. 19, 2022 (CN) .......................... 202210846599.5

(51) Int. Cl.
*H04B 10/40* (2013.01)
*G02F 1/035* (2006.01)
*G02F 1/21* (2006.01)
*H04B 10/50* (2013.01)

(52) U.S. Cl.
CPC .......... *H04B 10/40* (2013.01); *G02F 1/0356* (2013.01); *G02F 1/212* (2021.01); *H04B 10/503* (2013.01); *G02F 2202/20* (2013.01)

(58) Field of Classification Search
CPC ....... H04B 10/40; H04B 10/503; G02F 1/212; G02F 1/0356; G02F 2202/20
USPC .......................................................... 398/135
See application file for complete search history.

(56) References Cited

U.S. PATENT DOCUMENTS

| | | | |
|---|---|---|---|
| 9,680,576 B1* | 6/2017 | Middleton | ........... H04B 10/548 |
| 2013/0028610 A1* | 1/2013 | DeSalvo | ........... H04B 10/25758 |
| | | | 398/139 |
| 2017/0003524 A1* | 1/2017 | Schaefer | ............ H04B 10/2575 |
| 2022/0066278 A1* | 3/2022 | Flint | .................... H04B 10/516 |

* cited by examiner

*Primary Examiner* — Dalzid E Singh

(57) ABSTRACT

The photonic integrated chip includes a laser light source configured to generate an optical carrier, a first optical splitter configured to split the optical carrier into a first optical carrier and a second optical carrier, an optical local oscillation generation unit, and a photonic frequency conversion unit. The first optical splitter sends the first optical carrier and the second optical carrier to the photonic frequency conversion unit and the optical local oscillation generation unit. The optical local oscillation generation unit generates an optical local oscillation signal and send the optical local oscillation signal to the photonic frequency conversion unit. The photonic frequency conversion unit converts a first intermediate frequency signal into a first radio frequency signal through photonic up-conversion. The photonic frequency conversion unit converts a second radio frequency signal into a second intermediate frequency signal through photonic down-conversion.

10 Claims, 5 Drawing Sheets

PHOTONIC INTEGRATED CHIP AND ULTRA WIDE BAND RADIO FREQUENCY PHOTONIC TRANSCEIVER

TECHNICAL FIELD

The present disclosure relates to a technical field of communication, and in particular to a photonic integrated chip and an ultra wide band (UWB) radio frequency (RF) photonic transceiver.

BACKGROUND

In satellite and mobile communications, with continuous increasing of demands for bandwidth for transmitting data, carrier frequencies are becoming higher and higher correspondingly. The increasingly complex electromagnetic spectrum environment also puts higher demands on agility of the carrier frequencies. In the satellite communication, the carrier frequencies have covered Ka, Q, V and other frequency bands. In order to improve stability and reliability of satellite-ground communication and in order to avoid intentional interference from the enemy in the military field, a frequency of communication carriers needs to have the agility. In the mobile communications, the carrier frequencies of future 6G communications will cover bandwidths in a range of millimeter to terahertz. Further, cognitive radio (CR) and intelligent radio (IR) emphasized in an architecture of a 6G system need to reliably sense surrounding spectrum environment in a broadband and adaptively occupy a currently available local spectrum, so as to fully utilize various spectrum resources and limit and reduce an occurrence of spectrum conflicts.

Based on above requirements, a ground user terminal of the satellite communication and a terminal of the mobile communication need a radio frequency transceiver unit with a ultra side band frequency agility, and the radio frequency transceiver unit should have characteristics of compact size and high integration, so that the radio frequency transceiver unit can be easily integrated into various sizes of communication terminals.

SUMMARY

In view of this, a purpose of the present disclosure is to provide a photonic integrated chip and an ultra wide band (UWB) radio frequency (RF) photonic transceiver based on photonic integration technology that are used in satellite communication and mobile communication.

To achieve the above purpose, the present disclosure provides the photonic integrated chip for the ultra wide band radio frequency photonic transceiver. The photonic integrated chip comprises a laser light source LD configured to generate an optical carrier, a first optical splitter OC1 configured to split the optical carrier generated by the laser light source LD into a first optical carrier and a second optical carrier, an optical local oscillation generation unit, and a photonic frequency conversion unit.

The first optical splitter OC1 is further configured to send the first optical carrier to the photonic frequency conversion unit and send the second optical carrier to the optical local oscillation generation unit. The optical local oscillation generation unit is configured to generate an optical local oscillation signal required by the photonic frequency conversion unit and send the optical local oscillation signal required by the photonic frequency conversion unit to the photonic frequency conversion unit.

The photonic frequency conversion unit comprises a first input port, a first output port, a second input port, and a second output port. The photonic frequency conversion unit is configured to convert a first intermediate frequency (IF) signal input by the first input port into a first radio frequency signal. The first radio frequency signal is output by the first output port through photonic up-conversion. The photonic frequency conversion unit is further configured to convert a second radio frequency signal input by the second input port into a second intermediate frequency signal. The second intermediate frequency signal is output by the second output port through photonic down-conversion.

With photonic technology as a core, the present disclosure completes photonic up-conversion, photonic down-conversion, and generation of local oscillation in an optical filed. Since a frequency of the optical carrier for communication is generally of an order of $10^{14}$ HZ, and a signal frequency processed by the satellite communication and the 6G communication is generally in a range of $10^9$-$10^{12}$ Hz, so an electrical signal thereof is a narrowband signal with a relative bandwidth of less than 1% compared to the frequency of the optical carrier and ultra-wide working bandwidth of the microwave can be achieved through a narrowband processing architecture. In addition, a closed photoelectric oscillation loop is applied to generate the optical local oscillator signal, and by changing voltages applied to control electrodes of microring resonators in the closed photoelectric oscillation loop, a frequency of the optical local oscillation signal is flexibly changed, which realizes flexible switching of a carrier frequency. Furthermore, a structure of the UWB RF photonic transceiver of the present disclosure adopts a multi-chip micro-assembly process to integrate the photonic integrated chip and radio frequency chips on a same substrate, so that the ultra wide band radio frequency photonic transceiver has a high integration level and can well meet requirements of integration level and space size for a ground terminal of the satellite communication and a terminal of the mobile communication.

BRIEF DESCRIPTION OF DRAWINGS

In order to make objectives, technical solutions and advantages of the present disclosure clear, the present disclosure will be described in detail below with reference to accompanying drawings.

DETAILED DESCRIPTION

Figure 1:
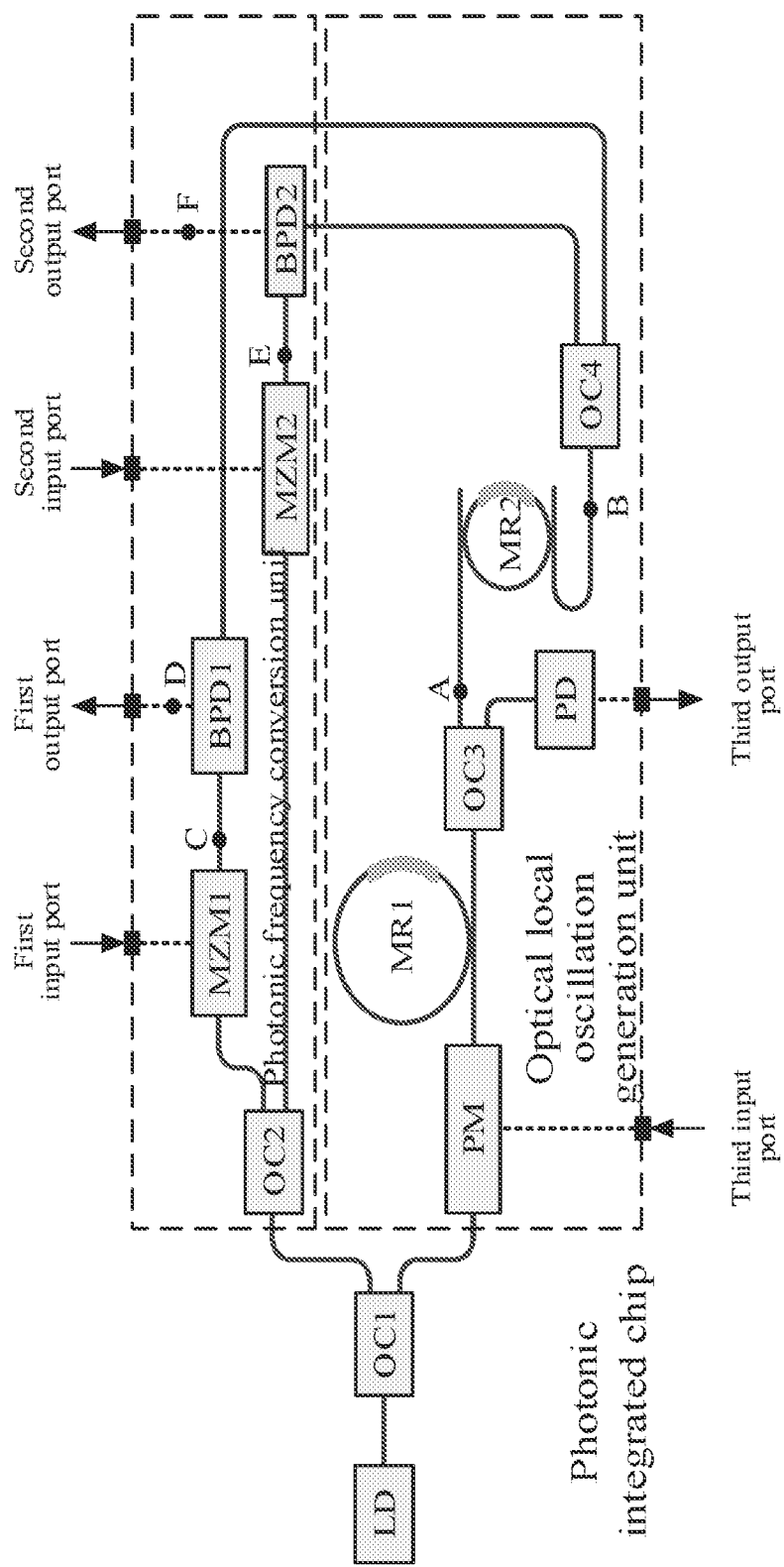
FIG. 1 is a schematic diagram of a photonic integrated chip according to one optional embodiment of the present disclosure.

As shown in FIG. 1, the present disclosure provides a photonic integrated chip for an ultra wide band (UWB) radio frequency (RF) photonic transceiver according to one optional embodiment. The photonic integrated chip comprises a laser light source LD, a first optical splitter OC1, an optical local oscillation generation unit, and a photonic frequency conversion unit. Units of the photonic integrated chip having functions of light emission, light modulation, light energy storage, and light detection may be integrated on a single chip by the photon heterogeneous integration technology, so that a size of the photonic integrated chip is greatly reduced to meet requirements of a terminal on an integration level and a space size of the photonic integrated chip.

Figure 2:
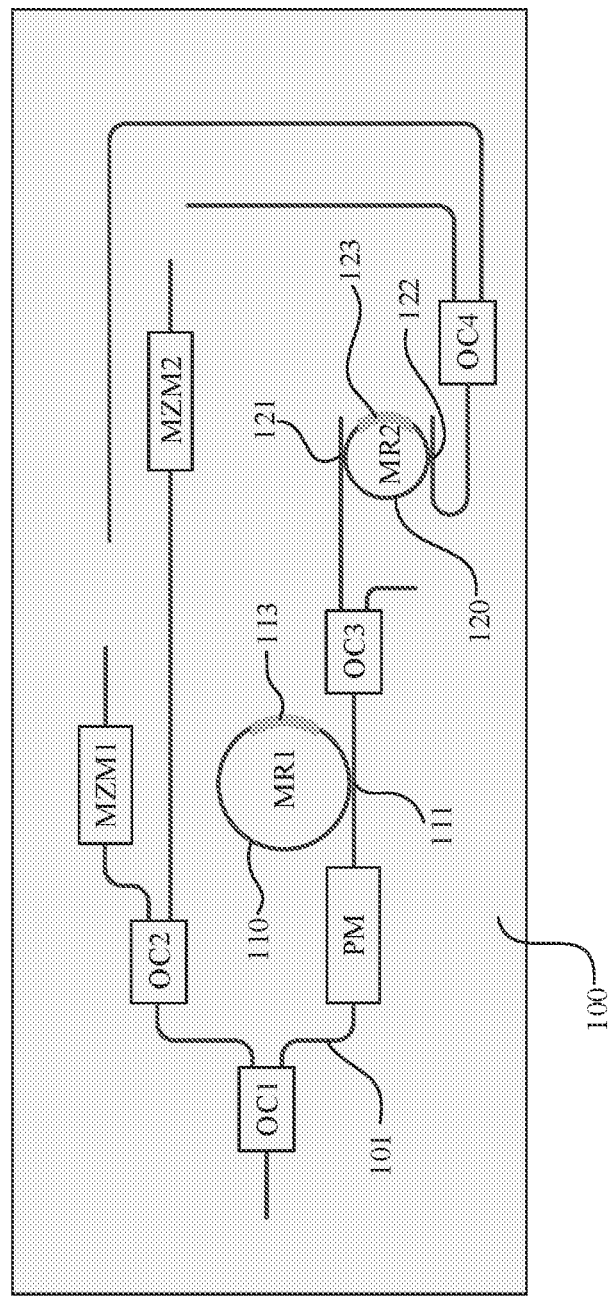
FIG. 2 is a schematic diagram of a thin film lithium niobate substrate where devices made of lithium niobate material are arranged on the thin film lithium niobate substrate.

Optionally, the optical local oscillation generation unit comprises an optical phase modulator PM, a first microring resonator MR1, a third optical splitter OC3, a high-speed photoelectric detector PD, a second microring resonator MR2, and a fourth optical splitter OC4. The photonic frequency conversion unit comprises a second optical splitter OC2, a first Mach-Zehnder modulator MZM1, a second Mach-Zehnder modulator MZM2, a first photoelectric balance detector BPD1, and a second photoelectric balance detector BPD2. In order to improve the integration level of the photonic integrated chip, a substrate of the photonic integrated chip is optionally a thin film lithium niobate substrate 100. The optical phase modulator PM, the first microring resonator MR1, the second microring resonator MR2, the first optical splitter OC1, the second optical splitter OC2, the third optical splitter OC3, the fourth optical splitter OC4, the first Mach-Zehnder modulator MZM1, the second Mach-Zehnder modulator MZM2, and lithium niobate optical waveguides 101 configured to connect optical paths of above devices are made of a thin film lithium niobate material and are directly formed on the thin film lithium niobate substrate 100. As shown in FIG. 2, these devices made of the thin film lithium niobate material are formed on the thin film lithium niobate substrate 100.

The laser light source LD, the high-speed photoelectric detector PD, the first photoelectric balance detector BPD1, and the second photoelectric balance detector BPD2 are optionally made of materials in groups III-V, and are integrally flip-welded on the thin film lithium niobate substrate 100.

An optical output end of the laser light source LD is aligned with a first lithium niobate optical waveguide 101 connected with an input end of the first optical splitter OC1 in three dimensions. An optical input end of the high-speed photoelectric detector PD is aligned with a second lithium niobate optical waveguide 101 connected with a second output end of the third optical splitter in three dimensions. A first optical input end of the first photoelectric balance detector BPD1 is aligned with a third lithium niobate optical waveguide 101 connected with an optical output end of the first Mach-Zehnder modulator MZM1 in three dimensions. A second optical input end of the first photoelectric balance detector BPD1 is aligned with a fourth lithium niobate optical waveguide 101 connected with a first output end of the fourth optical splitter OC4 in three dimensions. A first optical input end of the second photoelectric balance detector BPD2 is aligned with a fifth lithium niobate optical waveguide 101 connected with an optical output end of the second Mach-Zehnder modulator MZM2 in three dimensions. A second optical input end of the second photoelectric balance detector BPD2 is aligned with a sixth lithium niobate optical waveguide 101 connected with a second output end of the fourth optical splitter OC4 in three dimensions. As shown in FIG. 1, in order to integrate the above-mentioned device on the thin-film lithium niobate substrate 100.

The laser light source LD is a low-noise high-power laser light source, and is configured to provide a an optical carrier that is narrow-linewidth, low-relative-intensity noise, and high-power optical carrier, for the optical local oscillation generation unit and the photonic frequency conversion unit. Optionally, the first optical splitter OC1 is a 50:50 optical splitter.

The first optical splitter OC1 is configured to split the optical carrier generated by the laser light source LD into a first optical carrier and a second optical carrier. After being output through a first output end of the first optical splitter OC1, the first optical carrier is sent to the photonic frequency conversion unit through a seventh lithium niobate optical waveguide 101, so the photonic frequency conversion unit realizes a function of photonic up-conversion and photonic down-conversion. After being output through a second output end of the first optical splitter OC1, the second optical carrier is sent to the optical local oscillation generation unit through the lithium niobate optical waveguide 10, so the optical local oscillation generation unit realize a function of generating an optical local oscillator signal.

The optical local oscillation generation unit is configured to generate the optical local oscillation signal required by the photonic frequency conversion unit and send the optical local oscillation signal required by the photonic frequency conversion unit to the photonic frequency conversion unit. The optical local oscillation generation unit comprises a third input port and a third output port. An optical input end of the optical phase modulator PM is connected with the second output end of the first optical splitter OC1 through an eighth lithium niobate optical waveguide 101. An electrical input end of the optical phase modulator PM is connected with the third input port through a first microwave transmission line. The first microwave transmission line is optionally a microstrip line or a gold wire. An optical output end of the optical phase modulator PM is connected with an input end of the first microring resonator MR1 through a ninth lithium niobate optical waveguide 101. An output end of the first microring resonator MR1 is connected with an input end of the third optical splitter OC3 through a tenth lithium niobate optical waveguide 101. A first output end of the third optical splitter OC3 is connected with an input end of the second microring resonator MR2 through a eleventh lithium niobate optical waveguide 101. A second output end of the third optical splitter OC3 is connected with the optical input end of the high-speed photoelectric detector PD through the second lithium niobate optical waveguide 101. An electrical output end of the high-speed photoelectric detector PD is connected with the third output port through a second microwave transmission line. An output end of the second microring resonator MR2 is connected with an input end of the fourth optical splitter OC4 through a twelfth lithium niobate optical waveguide 101. The first output end and the second output end of the fourth optical splitter OC4 are respectively connected with the photonic frequency conversion unit through the fourth lithium niobate optical waveguide 101 and the sixth lithium niobate optical waveguide 101.

The optical phase modulator PM is configured to modulate a phase of the second optical carrier sent from the first optical splitter through a first microwave signal input from the electrical input end of the optical phase modulator PM and is configured to output an upper sideband optical signal and a lower sideband optical signal to the first microring resonator. MR1. A phase of the upper sideband optical signal is complementary to (i.e., a difference thereof is 180 degrees) a phase of the lower sideband optical signal.

The first microring resonator MR1 configured to align a center frequency of a resonance stopband of a first microring 110 with an upper sideband frequency corresponding to the optical local oscillation signal required by the photonic frequency conversion unit by adjusting a resonance position of the resonance stopband of the first microring 110, so an upper sideband signal of a required frequency in the upper side band optical signal and the lower sideband optical signal is filtered. The first microring resonator MR1 is a high-Q-value microring resonator and is configured to perform high-Q energy storage on input light. The first microring resonator MR1 comprises a straight waveguide 111 and the first microring 110 formed on the thin film lithium niobate substrate 100. A first end of the straight waveguide 111 is connected with the output end of the optical phase modulator PM through the ninth lithium niobate optical waveguide 101. A second end of the straight waveguide 111 is connected with the input end of the third optical splitter OC3 through the tenth lithium niobate optical waveguide 101. The first microring 110 is arranged on one side of the straight waveguide 111. A first control electrode 113 is arranged on the first microring 110. The first control electrode 113 is electrically connected with a first control line (not shown in the drawings), and is configured to connected with an external electric control signal through the first control line. An optical field transmission characteristic of the first microring resonator MR1 is periodic band-stop filtering. By changing a voltage of the external electric control signal connected with the first control electrode 113, a phase of the optical signal transmitted in the first microring 110 is changed, thereby changing the resonance position of the resonance stopband of the first microring 110.

The third optical splitter OC3 is optionally a 50:50 optical splitter. The third optical splitter OC3 is configured to split the optical signal output by the first microring resonator MR1 into a first optical signal and a second optical signal. The third optical splitter OC3 is configured to output the first optical signal to the second microring resonator MR2, and is configured to output the second optical signal to the high-speed photoelectric detector PD. The high-speed photoelectric detector PD is configured to convert the second optical signal into the second microwave signal. The high-speed photoelectric detector PD is configured to output the second microwave signal from the electrical output end of the high-speed photoelectric detector PD. The second microwave signal is amplified by an external low-noise amplifier and is finally turned into the first microwave signal and is sent to the optical phase modulator PM.

The second microring resonator MR2 is configured to align a center frequency of a resonance passband of the second microring 120 with a frequency of the optical local oscillation signal required by the photonic frequency conversion unit by adjusting a resonance position of the resonance passband of the second microring 120, so the first optical signal sent from the third optical splitter is filtered to output the optical local oscillation signal required by the photonic frequency conversion unit.

The second microring resonator MR2 is a download microring resonator. An optical field transmission spectrum of the second microring resonator MR2 has periodic bandpass filtering. The second microring resonator MR2 comprises a microring input waveguide 121, a microring output waveguide 122, and a second microring 120. The microring input waveguide 121, the microring output waveguide 122, and the second microring 120 are formed on the thin film lithium niobate substrate 100. The microring input waveguide 121 is connected with a corresponding output end of the third optical splitter OC3. The microring output waveguide 122 is connected with an input end of the fourth optical splitter OC4. The second microring 120 is arranged between the microring input waveguide 121 and the microring output waveguide 122. A second control electrode 123 is arranged on the second microring 120. The second control electrode 123 is electrically connected with a second control line (no shown in the drawings), and is configured to externally connected with the external electric control signal through the second control line. By changing a voltage of the external electric control signal connected with the second control electrode 123, a phase of the light signal transmitted in the second microring 120 is changed, thereby changing the resonance position of the resonance passband of the second microring 120. The center frequency of the resonance passband is aligned with the frequency of the optical local oscillation signal required by the photonic frequency conversion unit.

The fourth optical splitter OC4 is optionally a 50:50 optical splitter. The fourth optical splitter OC4 is configured to split the optical local oscillation signal required by the photonic frequency conversion unit and output by the second microring resonator MR2 into a first optical local oscillation signal and a second optical local oscillator signal. The first optical local oscillation signal and the second optical local oscillation signal are respectively sent to the photonic frequency conversion unit for photonic up-conversion and photonic down-conversion.

The photonic frequency conversion unit comprises a first input port, a first output port, a second input port, and a second output port. The photonic frequency conversion unit is configured to convert a first intermediate frequency (IF) signal input by the first input port into a first radio frequency signal output by the first output port, through photonic up-conversion. The photonic frequency conversion unit is further configured to convert a second radio frequency signal input by the second input port into a second intermediate frequency signal output by the second output port through photonic down-conversion.

The input end of the second optical splitter OC2 is connected with the first output end of the first optical splitter OC1 through the seventh lithium niobate optical waveguide 101. The first output end of the second optical splitter OC2 is connected with the optical input end of the first Mach-Zehnder modulator MZM1 through the thirteenth lithium niobate optical waveguide 101. A second output end of the second optical splitter OC2 is connected with the optical input end of the second Mach-Zehnder modulator MZM2 through a fourteenth lithium niobate optical waveguide 101. The first Mach-Zehnder modulator MZM1 and the second Mach-Zehnder modulator MZM2 are dual parallel Mach-Zehnder modulators. An electrical input end of the first Mach-Zehnder modulator MZM1 is connected with the first input port through a third microwave transmission line. The optical output end of the first Mach-Zehnder modulator MZM1 is connected with the first optical input end of the first photoelectric balance detector BPD1 through the third lithium niobate optical waveguide 101. The second optical input end of the first photoelectric balance detector BPD1 is connected with the first output end of the fourth optical splitter OC4 through the fourth lithium niobate optical waveguide 101. An electric output end of the first photoelectric balance detector BPD1 is connected with the first output port through a fourth microwave transmission line. An electrical input end of the second Mach-Zehnder modulator MZM2 is connected with the second input port through a fifth microwave transmission line. An optical output end of the second Mach-Zehnder modulator MZM2 is connected with a first optical input end of the second photoelectric balance detector BPD2 through the fifth lithium niobate optical waveguide 101. A second optical input end of the second photoelectric balance detector BPD2 is connected with the second output end of the fourth optical splitter OC4 through the sixth lithium niobate optical waveguide 101. An electrical output end of the second photoelectric balance detector BPD2 is connected with the second output port through a sixth microwave transmission line.

The second optical splitter OC2 is optionally a 50:50 optical splitter. The second optical splitter OC2 is configured to split the first optical carrier sent by the first optical splitter OC1 into a first sub optical carrier and a second sub optical carrier. The second optical splitter OC2 is configured to send the first sub optical carrier to the first Mach-Zehnder modulator MZM1 for optical carrier modulation before the photonic up-conversion and send the second sub optical carrier to the second Mach-Zehnder modulator MZM2 for optical carrier modulation before the photonic down-conversion.

The first Mach-Zehnder modulator MZM1 is configured to modulate double sidebands of the first sub optical carrier sent by the second optical splitter through the first intermediate frequency signal input by the first input port for carrier suppression. The first Mach-Zehnder modulator MZM1 is configured to send a first optical modulation signal to the first photoelectric balance detector BPD1.

The first photoelectric balance detector BPD1 is configured to perform optical beat frequency on the first optical modulation signal sent by the first Mach-Zehnder modulator MZM1 and the first optical local oscillation signal sent by the fourth optical splitter OC4 to obtain a first microwave radio frequency signal (I.e. the first radio frequency signal). The first photoelectric balance detector BPD1 is configured to output the first microwave radio frequency signal to the first output port.

The second Mach-Zehnder modulator MZM2 is configured to modulate double sidebands of the second sub optical carrier sent by the second optical splitter through a second microwave radio frequency signal (i.e. the second radio frequency signal) input by the second input port for carrier suppression, and is configured to send a second optical modulation signal to the second photoelectric balance detector BPD2. The second photoelectric balance detector BPD2 is configured to perform optical beat frequency on the second optical modulation signal sent by the second Mach-Zehnder modulator MZM2 and the second optical local oscillation signal sent by the fourth optical splitter OC4 to obtain the second intermediate frequency signal and output the second intermediate frequency signal to the second output port.

Figure 3:
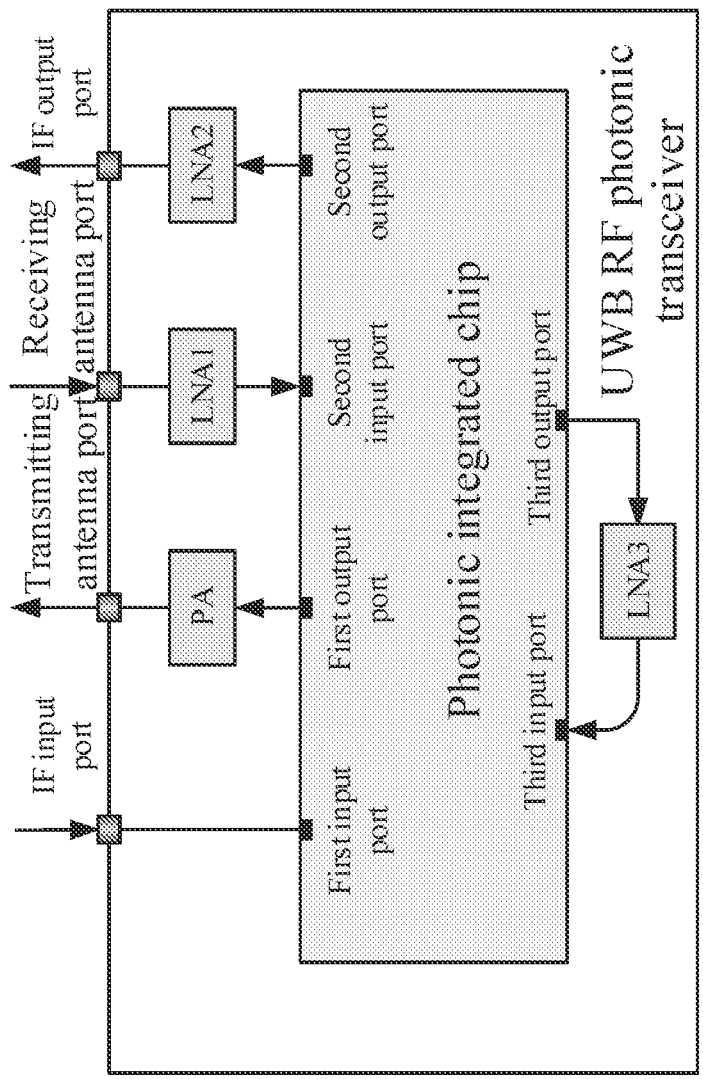
FIG. 3 is a schematic diagram of an ultra wide band radio frequency photonic transceiver according to one optional embodiment of the present disclosure.

The present disclosure further provides the ultra wide band radio frequency photonic transceiver. As shown in FIG. 3, in one optional embodiment of the present disclosure, the ultra wide band radio frequency photonic transceiver comprises the photonic integrated chip, a power amplifier PA, a first low noise amplifier LNA1, a second low noise amplifier LNA2, a third low noise amplifier LNA3, an intermediate frequency input port, a transmitting antenna port, a receiving antenna port, and an intermediate frequency output port.

The first input port of the photonic integrated chip is electrically connected with the intermediate frequency input port. The first output port of the photonic integrated chip is electrically connected with the transmitting antenna port through the power amplifier PA. The second input port of the photonic integrated chip is electrically connected with the receiving antenna port through the first low noise amplifier LNA1. The second output port of the photonic integrated chip is electrically connected with the intermediate frequency output port through the second low noise amplifier LNA2. The third output port of the photonic integrated chip is electrically connected with the third input port of the photonic integrated chip through the third low noise amplifier LNA3. The photonic integrated chip, the power amplifier PA, the first low noise amplifier LNA1, the second low noise amplifier LNA2, and the third low noise amplifier LNA3 are optionally integrated on a ceramic substrate based on a radio frequency photon hybrid integration process.

The first low noise amplifier LNA1 is configured to amplify an input weak microwave radio frequency signal received by the receiving antenna port into the second radio frequency signal with a proper power. The first amplified microwave signal is sent to the second input port of the photonic integrated chip. The second low noise amplifier LNA2 is configured to amplify the second intermediate frequency signal sent by the second output port of the photonic integrated chip and then output an amplified intermediate frequency signal with a proper power to the intermediate frequency output port. The first low noise amplifier LNA1 and the second low noise amplifier LNA2 have a lower noise coefficient, and a working frequency band of the first low noise amplifier LNA1 and the second low noise amplifier LNA2 covers a working frequency band of the ultra wide band radio frequency photonic transceiver.

The power amplifier PA is configured to amplify a first radio frequency signal sent by the first output port of the photonic integrated chip and output an amplified radio frequency signal to the transmitting antenna port. The second amplified second microwave signal is transmitted by the transmitting antenna port. The gain of the power amplifier PA is selected according to a range required to be covered by a transmitting antenna. A working frequency band of the power amplifier PA covers the working frequency band of the ultra wide band radio frequency photonic transceiver. The third low noise amplifier LNA3 is configured to amplify the second microwave signal output by the third output port of the photonic integrated chip into an amplified microwave signal, and the amplified microwave signal turns into the first microwave signal during a transmission process, then the first microwave signal is sent to the third input port of the photonic integrated chip. The third low noise amplifier LNA3 has a characteristic of low additional phase noise, and a working frequency band of third low noise amplifier LNA3 covers the working frequency band of the ultra wide band radio frequency photonic transceiver.

Figure 4:
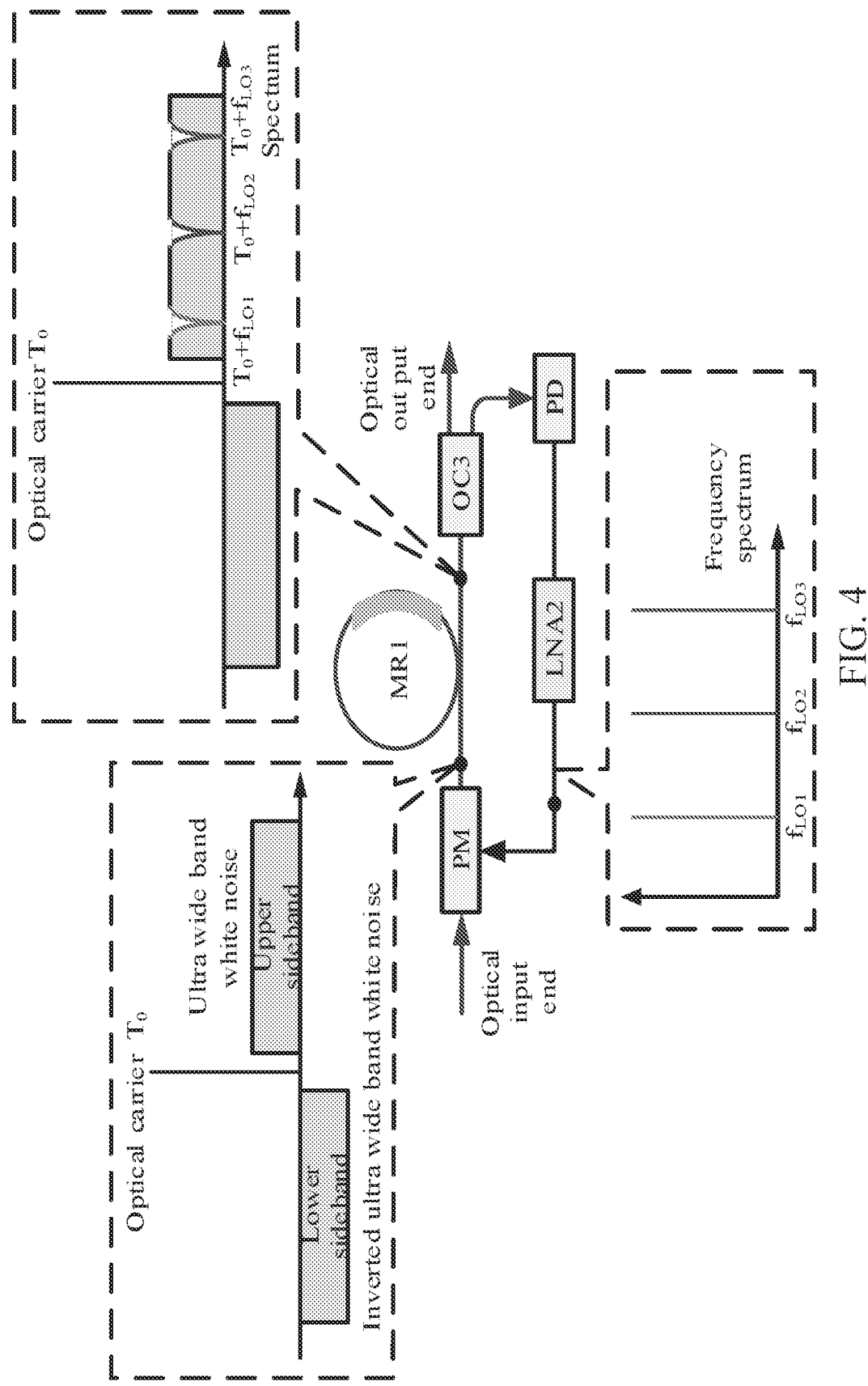
FIG. 4 is a schematic diagram showing a principle of a frequency-tunable photoelectric oscillator.
Figure 5:
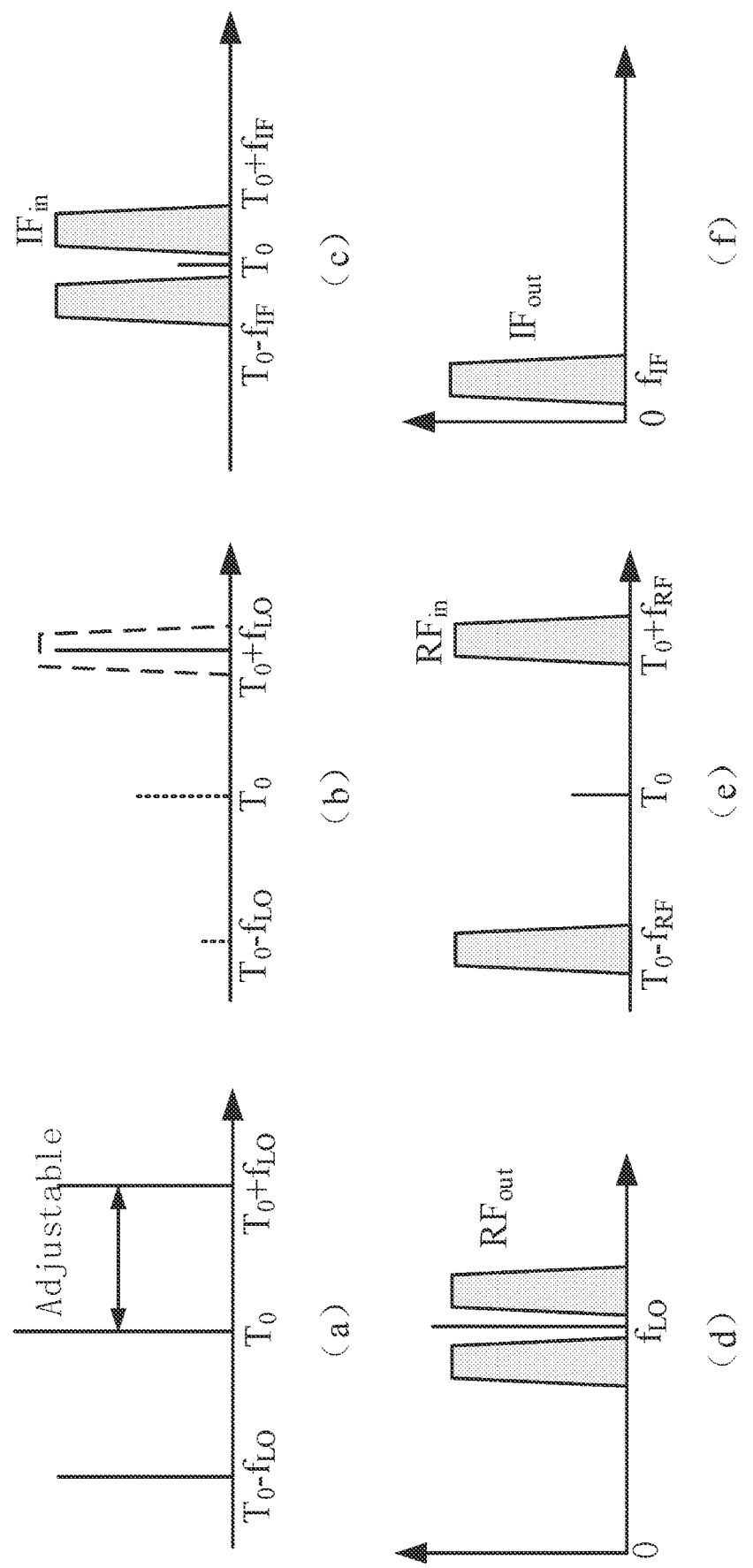
FIG. 5 is a schematic diagram of spectra or electrical spectrum of key points A-F in FIG. 1.

A working principle of the embodiment is as follow:

As shown in FIGS. 1-5, the optical carrier output by the laser light source LD (assuming that the frequency of the optical carrier is $T_0$) is split into the first optical carrier and the second optical carrier by the first optical splitter OC1. The first optical carrier and the second optical carrier are respectively sent to the photonic frequency conversion unit and the optical local oscillation generation unit. As shown in FIG. 4 and FIG. 5, in the optical local oscillation generation unit, the optical phase modulator PM modulates the phase of the second optical carrier sent by the first optical splitter OC1 through the first microwave signal input by the third input port. Then the optical phase modulator PM generates the upper sideband optical signal and the lower sideband optical signal that are sent to the first microring resonator MR1. The phase of the upper sideband optical signal is complementary to (i.e., a difference thereof is 180 degrees)

the phase of the lower sideband optical signal. Since an optical field transmission characteristics of the first microring resonator MR1 is periodic band-stop filtering, by designing a diameter of the first microring 110, a filtering period of the first microring resonator MR1 is much greater than the working bandwidth of the third low noise amplifier LNA3, ensuring that only one stopband falls within upper and lower white noise sidebands. By changing a voltage of the external electrical control signal connected with the first control electrode 113, a phase of transmission light in the first microring 110 is changed, thereby changing the resonance position of the resonance stopband of the first microring 110.

FIG. 4 schematically illustrates the positions of three resonance stopbands (i.e., $T_0+F_{LO}1$, $T_0+F_{LO2}$, and $T_0+F_{LO3}$). As shown in FIG. 4, if the center frequency of the resonance stopband is $(T_0+F_{LO})$, noise of an upper sideband of the frequency point is suppressed, and after noise at the lower sideband with a frequency of $(T_0-F_{LO})$ of frequency point and the carrier perform the beat frequency, the highest noise at the frequency point $f_{LO}$ is observed when viewed on the electrical spectrum, so that oscillation lasing occurs at the frequency point $F_{LO}$, and the microwave signal (i.e., the optical signal) with a frequency of $f_{LO}$ is generated. The microwave signal is loaded on the optical carrier for output.

As shown in FIG. 5(a), according to the spectrogram of the optical signal of the first output end (point A in FIG. 1) of the third optical splitter OC3, it can be seen that two sides of the spectrum $T_0$ of the second optical carrier generate the lower sideband optical signal with a frequency of $(T_0-f_{LO})$ and the upper sideband optical signal with a frequency of $(T_0+f_{LO})$. The lower sideband optical signal with the frequency of $(T_0-f_{LO})$ and the upper sideband optical signal with the frequency of $(T_0+f_{LO})$ are split into the first optical signal and the second optical signal by the third optical splitter OC3. The second optical signal is converted into the second microwave signal through the high-speed photoelectric detector PD, is output through the third output port, is amplified by the third low-noise amplifier LNA3 and turns into the first microwave signal. The first microwave signal is then input through the third input port and finally sent to the electric input end of the optical phase modulator PM, which forms a closed photoelectric oscillation loop through the optical phase modulator PM, the first microring resonator MR1, the third optical splitter OC3, the high-speed photoelectric detector PD, the third input port, the third low noise amplifier LNA3 and the third output port. The closed photoelectric oscillation loop form a photoelectric oscillator whose output frequency is tunable. A working principle thereof is shown in FIG. 4. The noise generated by the third low noise amplifier LNA3 is acted as a seed source and oscillated in the closed photoelectric oscillation loop. Since there is gain competition between the noise of different frequencies; if an initial power of the noise at a certain frequency point is the highest, then oscillation lasing occurs at the certain frequency point, generating the microwave signal having the same frequency as the certain frequency point. Further, due to the high Q energy storage characteristics of the first microring resonator MR1, the generated microwave signal (the optical signal) has a characteristics of low phase noise.

The first optical signal output by the third optical splitter OC3 is sent to the second microring resonator MR2. The diameter of the second microring 120 is meticulously designed, so that a filtering period of the second microring 120 is far greater than the working bandwidth of the third low noise amplifier LNA3. By changing the voltage of the external electric control signal connected with the second control electrode 123, the phase of the transmission light in the second microring 120 is changed, thereby changing the resonance position of the resonance passband of the second microring 120. As shown in FIG. 5(b), when the center frequency of the resonance passband is aligned with the upper sideband optical signal with the frequency of $(T_0+f_{LO})$, it can be seen from the spectrogram of the first optical signal at the output end (point B in FIG. 1) of the second microring resonator MR2 that the second microring resonator MR2 is able to filter out optical signals of other frequencies, and only the optical local oscillation signal with the frequency of $(T_0+f_{LO})$ is left. The optical local oscillation signal with the frequency of $(T_0+f_{LO})$ is split into the first optical local oscillation signal and the second optical local oscillation signal through the fourth optical splitter OC4. The first optical local oscillation signal and the second optical local oscillation signal are respectively sent to the first photoelectric balance detector BPD1 and the second photoelectric balance detector BPD2

As shown in FIG. 5, in the photonic frequency conversion unit, the first optical carrier sent by the first optical splitter OC1 is split into the first sub optical carrier and the second sub optical carrier through the second optical splitter OC2. The first sub optical carrier and the second sub optical carrier are respectively sent to the optical input end of the first Mach-Zehnder modulator MZM1 and the optical input end of the second Mach-Zehnder modulator MZM1. In a transmitting state, an external to-be-transmitted intermediate frequency signal $IF_{in}$ (i.e. the first intermediate frequency signal, and assuming that the frequency of the first intermediate frequency signal is $f_{IF}$) is input through the intermediate frequency input port of the ultra wide band radio frequency photonic transceiver, and is sent to the electrical input end of the first Mach-Zehnder modulator MZM1 through the first input port of the photonic frequency conversion unit. The first Mach-Zehnder modulator MZM1 modulates the double sidebands of the first optical carrier through the first intermediate frequency signal $IF_{in}$ for carrier suppression.

The optical output end of the first Mach-Zehnder modulator MZM1 (point C in FIG. 1) generates an upper sideband with a frequency of $(T_0+f_I)$ and a lower sideband with a frequency of $(T_0-f_{IF})$, and the spectrum thereof is shown in FIG. 5(c). The upper sideband with the frequency of $(T_0+f_I)$ and the lower sideband with the frequency of $(T_0-f_{IF})$ are sent to the first photoelectric balance detector BPD1 and perform the photonic up-conversion with the first optical local oscillation signal with the frequency of $(T_0+f_{LO})$ sent from the optical local oscillator unit. That is, the light with the frequency $(T_0+f_L)$ is subjected to beat frequency with the light with the frequency of $(T_0±f_{IF})$, so that the microwave radio frequency signal (i.e., the first radio frequency signal) with a frequency of $(f_{LO}±f_{IF})$ is obtained at the electric output port thereof (i.e., the point D in FIG. 1), and the spectrogram of the microwave radio frequency signal is shown in FIG. 5(d). In addition, a balance detection process of the first photoelectric balance detector BPD1 eliminates common mode noise caused by the input optical carrier. The microwave radio frequency signal with the frequency of $(f_{LO}±f_{IF})$ is output by the first output port of the photonic frequency conversion unit and then sent to the power amplifier PA for amplification, and the amplified microwave radio frequency signal is sent to the transmitting antenna port. That is, the amplified microwave radio frequency signal is transmitted outwards through an externally connected transmitting antenna. During transmission, the amplified microwave radio frequency signal (i.e., the amplified radio frequency signal) turns into a weak radio frequency signal.

In a receiving state, the weak microwave radio frequency signal $RF_{in}$ (assuming that the frequency of the weak microwave radio frequency signal $RF_{in}$ is $f_{RF}$) sent through the receiving antenna port of the ultra wide band radio frequency photonic transceiver is amplified into the second radio frequency signal by the first low noise amplifier LNA1, and the second radio frequency signal is input from the second input port of the photonic frequency conversion unit and sent to the electrical input end of the second Mach-Zehnder modulator MZM2. The second Mach-Zehnder modulator MZM2 modulate the double sidebands of the second sub optical carrier for carrier suppression through the second radio frequency signal. The optical output end of the second Mach-Zehnder modulator MZM2 (point E in FIG. 1) generates the upper sideband with the frequency of $(T_0+f_{RF})$ and the lower sideband with the frequency of $(T_0-f_{RF})$, whose spectrum is shown in FIG. 5(e).

The upper sideband with the frequency of $(T_0+f_{RF})$ and the lower sideband with the frequency of $(T_0-f_{RF})$ are sent to the second photoelectric balance detector BPD2, and perform the photonic down-conversion with the second optical local oscillation signal with the frequency of $(T_0+f_{LO})$ that is sent from the optical local oscillation generation unit, i.e., the light with the frequency of $(T_0+f_{LO})$ is subjected to beat frequency with the light with frequency $(T_0\pm f_{RF})$, so as to obtain the second intermediate frequency signal with the frequency of $(f_{LO}\pm f_{RF})$ at the electrical output end of the second photoelectric balance detector BPD2 (i.e., the point F in FIG. 1), whose electrical spectrum is shown in FIG. 5(f). In addition, a balance detection process of the second photoelectric balancing detector BPD2 eliminates the common mode noise caused by the input optical carrier. The second intermediate frequency signal with the frequency of $(f_{LO}\pm f_{RF})$ is output from the second output port of the photo frequency conversion unit, and is amplified into the amplified intermediate frequency by the second low noise amplifier LNA2. The amplified intermediate frequency is then output from the intermediate frequency output port for processing by subsequent modules.

The present disclosure has following characteristics:

The present disclosure has an ultra-wide working bandwidth. In future satellite communication and 6G communication, a working frequency band of a transceiving terminal needs to cover a wider frequency range. In the microwave technology of the prior art, a current amplifier is able to cover the ultra-wide working bandwidth, but a frequency converter and a local oscillator of the transceiving terminal are unable to cover the ultra-wide working bandwidth by themselves. With photonic technology as a core, the present disclosure completes photonic up-conversion, photonic down-conversion, and generation of local oscillation in the optical field. Since a frequency of optical carrier for communication is generally of an order of $10^{14}$ HZ, and a signal frequency processed by the satellite communication and the 6G communication is generally in a range of $10^9$-$10^{12}$ Hz, so an electrical signal thereof is a narrowband signal with a relative bandwidth of less than 1% compared to the frequency of the optical carrier. Moreover, for any system, it is much easier to process the narrowband signal than processing the wideband signal. Therefore, it is easier to perform photonic up-conversion, photonic down-conversion, and local oscillation on the optical field.

In the embodiment, core units for realizing photoelectric/electro-optical conversion have the capacity of covering the frequency band in the range of $10^9$-$10^{12}$ Hz, so that under the narrow-band processing architecture proposed in the embodiment, a process of photonic up-conversion, a process of photonic down-conversion, and a process of generating the optical local oscillation based on the closed photoelectric oscillation loop cover the frequency band in the range of $10^9$-$10^{12}$ Hz. Therefore, the ultra wide band radio frequency photonic transceiver of the embodiment has a characteristic of ultra-wide working bandwidth.

The working frequency band is flexible and switchable,

In addition to the capability of having ultra-wide working bandwidth, the transceiving terminal of the future satellite communication and 6G communication should also have a capability of flexibly switching the frequency of the transceiving carrier. In the present disclosure, the closed photoelectric oscillation loop is applied to generate the optical local oscillation signal (i.e. the optical carrier), and by changing the voltages applied to the control electrodes of the microring resonators in the closed photoelectric oscillation loop, the frequency of the optical local oscillation signal is flexibly changed, which realizes flexible switching of the carrier frequency. Therefore, the ultra wide band radio frequency photonic transceiver proposed in the embodiment has a characteristic that the working frequency band is flexible and switchable.

The present disclosure has a high integration level.

The ultra wide band radio frequency photonic transceiver of the present embodiment only comprises four radio frequency chips (i.e., the power amplifier PA, the first low noise amplifier LNA1, the second low noise amplifier LNA2, the third low noise amplifier LNA3) and the photonic integrated chip, The photonic integrated chip and the radio frequency chips are integrated on a same substrate by a multi-chip micro-assembly process, so that the ultra wide band radio frequency photonic transceiver has a high integration level and can well meet requirements of integration level and space size for the ground terminal of the satellite communication and the terminal of the mobile communication.

What is claimed is:

1. A photonic integrated chip for an ultra wide band radio frequency photonic transceiver, comprising:
    a laser light source LD configured to generate an optical carrier;
    a first optical splitter OC1 configured to split the optical carrier generated by the laser light source LD into a first optical carrier and a second optical carrier;
    an optical local oscillation generation unit; and
    a photonic frequency conversion unit;
    wherein the first optical splitter OC1 is further configured to send the first optical carrier to the photonic frequency conversion unit and send the second optical carrier to the optical local oscillation generation unit; the optical local oscillation generation unit is configured to generate an optical local oscillation signal required by the photonic frequency conversion unit and send the optical local oscillation signal required by the photonic frequency conversion unit to the photonic frequency conversion unit;
    wherein the photonic frequency conversion unit comprises a first input port, a first output port, a second input port, and a second output port, the photonic frequency conversion unit is configured to convert a first intermediate frequency signal input by the first input port into a first radio frequency signal output by the first output port, through photonic up-conversion;

the photonic frequency conversion unit is further configured to convert a second radio frequency signal input by the second input port into a second intermediate frequency signal output by the second output port through photonic down-conversion.

2. The photonic integrated chip according to claim 1, wherein the photonic frequency conversion unit comprises a second optical splitter OC2; the optical local oscillation generation unit comprises an optical phase modulator PM, a first microring resonator MR1, a third optical splitter OC3, a high-speed photoelectric detector PD, a second microring resonator MR2, and a fourth optical splitter OC4;

wherein the optical phase modulator PM is configured to modulate a phase of the second optical carrier sent from the first optical splitter OC1 through a first microwave signal input from an electrical input end of the optical phase modulator PM and is configured to output an upper sideband optical signal and a lower sideband optical signal to the first microring resonator MR1; a phase of the upper sideband optical signal is complementary to a phase of the lower sideband optical signal;

wherein the first microring resonator MR1 is configured to align a center frequency of a resonance stopband of a first microring with an upper sideband frequency corresponding to the optical local oscillation signal required by the photonic frequency conversion unit by adjusting a resonance position of the resonance stopband of the first microring, so an upper sideband signal of a required frequency in the upper side band optical signal and the lower sideband optical signal is filtered;

wherein the third optical splitter OC3 is configured to split an optical signal output by the first microring resonator MR1 into a first optical signal and a second optical signal; the third optical splitter OC3 is configured to output the first optical signal to the second microring resonator MR2, and is configured to output the second optical signal to the high-speed photoelectric detector PD;

wherein the high-speed photoelectric detector PD is configured to convert the second optical signal into a second microwave signal; the high-speed photoelectric detector PD is configured to output the second microwave signal from an electrical output end of the high-speed photoelectric detector PD;

wherein the second microring resonator MR2 is configured to align a center frequency of a resonance passband of the second microring with a frequency of the optical local oscillation signal required by the photonic frequency conversion unit by adjusting a resonance position of the resonance passband of the second microring, so the first optical signal sent from the third optical splitter OC3 is filtered to output the optical local oscillation signal required by the photonic frequency conversion unit;

wherein the fourth optical splitter OC4 is configured to split the optical local oscillation signal output by the second microring resonator MR2 into a first optical local oscillation signal and a second optical local oscillator signal; the first optical local oscillation signal and the second optical local oscillation signal are respectively sent to the photonic frequency conversion unit.

3. The photonic integrated chip according to claim 2, wherein a substrate of the photonic integrated chip is a thin film lithium niobate substrate; the laser light source LD, the first optical splitter OC1, the photonic frequency conversion unit, and the optical local oscillation generation unit are integrated on the thin film lithium niobate substrate; the first optical splitter OC1, the third optical splitter OC3, the fourth optical splitter OC4, the first microring resonator MR1, the second microring resonator MR2, and the optical phase modulator PM are directly formed on the thin film lithium niobate substrate; the laser light source LD and the high-speed photoelectric detector PD are flip-welded on the thin film lithium niobate substrate.

4. The photonic integrated chip according to claim 3, wherein first microring resonator MR1 is a high-Q-value microring resonator and is configured to perform high-Q energy storage on input light; the first microring resonator MR1 comprises a straight waveguide and the first microring formed on the thin film lithium niobate substrate; a first end of the straight waveguide is connected with an output end of the optical phase modulator PM; a second end of the straight waveguide is connected with an input end of the third optical splitter OC3; the first microring is arranged on one side of the straight waveguide; a first control electrode is arranged on the first microring; the first control electrode is configured to connected with an external electric control signal.

5. The photonic integrated chip according to claim 3, wherein the second microring resonator MR2 is a download microring resonator; an optical field transmission spectrum of the second microring resonator MR2 has periodic bandpass filtering; the second microring resonator MR2 comprises a microring input waveguide, a microring output waveguide, and a second microring; the microring input waveguide, the microring output waveguide, and the second microring are formed on the thin film lithium niobate substrate; the microring input waveguide is connected with an output end of the third optical splitter OC3; the microring output waveguide is connected with an input end of the fourth optical splitter OC4; the second microring is arranged between the microring input waveguide and the microring output waveguide; a second control electrode is arranged on the second microring; the second control electrode is configured to externally connected with an external electric control signal.

6. The photonic integrated chip according to claim 2, wherein the photonic integrated chip comprises a third input port and a third output port; the electrical input end of the optical phase modulator PM is connected with the third input port by a first microstrip line or a first gold wire; the third input port is configured to connect with an output end of the external low-noise amplifier; the electrical output end of the high-speed photoelectric detector PD is connected with the third output port by a second microstrip line or a second gold wire; the third output port is configured to connect with an input end of an external low-noise amplifier.

7. The photonic integrated chip according to claim 2, wherein the photonic frequency conversion unit further comprises a first Mach-Zehnder modulator MZM1, a second Mach-Zehnder modulator MZM2, a first photoelectric balance detector BPD1, and a second photoelectric balance detector BPD2;

wherein the second optical splitter OC2 is configured to split the first optical carrier sent by the first optical splitter OC1 into a first sub optical carrier and a second sub optical carrier; the second optical splitter OC2 is configured to send the first sub optical carrier to the first Mach-Zehnder modulator MZM1 and send the second sub optical carrier to the second Mach-Zehnder modulator MZM2;

wherein the first Mach-Zehnder modulator MZM1 is configured to modulate double sidebands of the first sub optical carrier sent by the second optical splitter through the first intermediate frequency signal input by the first input port for carrier suppression; and the first Mach-Zehnder modulator MZM1 is configured to send a first optical modulation signal to the first photoelectric balance detector BPD1;

wherein the first photoelectric balance detector BPD1 is configured to perform optical beat frequency on the first optical modulation signal sent by the first Mach-Zehnder modulator MZM1 and the first optical local oscillation signal sent by the fourth optical splitter OC4 to obtain the first radio frequency signal; the first photoelectric balance detector BPD1 is configured to output the first radio frequency signal to the first output port;

wherein the second Mach-Zehnder modulator MZM2 is configured to modulate double sidebands of the second sub optical carrier sent by the second optical splitter OC2 through the second radio frequency signal input by the second input port for carrier suppression; and is configured to send a second optical modulation signal to the second photoelectric balance detector BPD2;

wherein the second photoelectric balance detector BPD2 is configured to perform optical beat frequency on the second optical modulation signal sent by the second Mach-Zehnder modulator MZM2 and the second optical local oscillation signal sent by the fourth optical splitter OC4 to obtain the second intermediate frequency signal and output the second intermediate frequency signal to the second output port.

8. The photonic integrated chip according to claim 7, wherein a substrate of the photonic integrated chip is a thin film lithium niobate substrate; the second optical splitter OC2, the first Mach-Zehnder modulator MZM1, and the second Mach-Zehnder modulator MZM2 of the photonic frequency conversion unit are directly formed on the thin film lithium niobate substrate; the first photoelectric balance detector BPD1 and the second photoelectric balance detector BPD2 are flip-welded on the thin film lithium niobate substrate.

9. An ultra wide band radio frequency photonic transceiver, comprising:
the photonic integrated chip according to claim 1;
a first low noise amplifier LNA1 configured to amplify an external radio frequency signal into the second radio frequency signal and send the second radio frequency signal to the second input port of the photonic integrated chip;
a second low noise amplifier LNA2 configured to amplify the second intermediate frequency signal sent by the second output port of the photonic integrated chip and then output an amplified intermediate frequency signal;
a power amplifier PA configured to amplify the first radio frequency sent by the first output port of the photonic integrated chip and output an amplified radio frequency signal; and
a third low noise amplifier LNA3 configured to amplify a second microwave signal output by the optical local oscillation generation unit of the photonic integrated chip into a first microwave signal and send the first microwave signal to the optical local oscillation generation unit of the photonic integrated chip.

10. The ultra wide band radio frequency photonic transceiver according to claim 9, wherein the ultra wide band radio frequency photonic transceiver further comprises a ceramic substrate; the photonic integrated chip, the power amplifier PA, the first low noise amplifier LNA1, the second low noise amplifier LNA2, and the third low noise amplifier LNA3 are integrated on the ceramic substrate based on a radio frequency photon hybrid integration process.

* * * * *